United States Patent
Zhang et al.

(10) Patent No.: US 10,401,837 B2
(45) Date of Patent: Sep. 3, 2019

(54) GENERATING RISK INVENTORY AND COMMON PROCESS WINDOW FOR ADJUSTMENT OF MANUFACTURING TOOL

(71) Applicant: GLOBALFOUNDRIES Inc., Grand Cayman (KY)

(72) Inventors: Hongxin Zhang, Clifton Park, NY (US); Shaowen Gao, Clifton Park, NY (US); Norman Chen, Malta, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 68 days.

(21) Appl. No.: 15/719,680

(22) Filed: Sep. 29, 2017

(65) Prior Publication Data
US 2019/0101905 A1    Apr. 4, 2019

(51) Int. Cl.
G05B 19/418     (2006.01)
G06F 17/50      (2006.01)

(52) U.S. Cl.
CPC ............ *G05B 19/41845* (2013.01); *G05B 2219/36089* (2013.01); *G05B 2219/45031* (2013.01)

(58) Field of Classification Search
CPC .............................................. G05B 19/41845
USPC ........................................ 716/50, 54
See application file for complete search history.

(56) References Cited

U.S. PATENT DOCUMENTS

| | | | |
|---|---|---|---|
| 5,965,306 A * | 10/1999 | Mansfield et al. | G03F 1/84 430/22 |
| 6,128,067 A * | 10/2000 | Hashimoto | G03F 7/70125 355/52 |
| 6,338,922 B1 * | 1/2002 | Liebmann et al. | G03F 7/70425 430/5 |
| 6,526,164 B1 * | 2/2003 | Mansfield et al. | G03F 7/7065 356/237.1 |
| 6,749,972 B2 | 6/2004 | Yu | |
| 6,925,202 B2 * | 8/2005 | Karklin et al. | G01N 21/95607 348/126 |
| 7,458,060 B2 * | 11/2008 | Croffie et al. | G06F 17/5072 716/56 |
| 7,584,077 B2 * | 9/2009 | Bergman et al. | G06F 17/5081 703/1 |
| 7,606,724 B2 * | 10/2009 | Chao et al. | G06Q 10/06 705/7.25 |
| 7,694,267 B1 | 4/2010 | Ye et al. | |
| 8,869,075 B2 | 10/2014 | Sun et al. | |
| 2003/0134205 A1 | 7/2003 | Yu | |

(Continued)

*Primary Examiner* — Sun J Lin
(74) *Attorney, Agent, or Firm* — Anthony Canale; Hoffman Warnick LLC

(57) ABSTRACT

A method disclosed herein includes: converting an image of a manufactured circuit to a plurality of representative contours, the plurality of representative contours corresponding to printed features in the manufactured circuit; generating a risk inventory for the manufactured circuit based on the plurality of representative contours, the risk inventory being configured to identify at least one process sensitive geometry (PSG) in the manufactured circuit; generating a common process window (CPW) for the manufactured circuit based on the plurality of representative contours and the risk inventory, the CPW being indicative of manufacturing reliability of each feature in the manufactured circuit; and generating instructions to adjust a manufacturing tool for creating the manufactured circuit, based on the generated CPW.

17 Claims, 11 Drawing Sheets

(56) References Cited

U.S. PATENT DOCUMENTS

2006/0273266 A1    12/2006   Preil et al.
2015/0213374 A1     7/2015   Agarwal et al.
2017/0004233 A1*   1/2017   Han et al. .................. G03F 1/36

* cited by examiner

GENERATING RISK INVENTORY AND COMMON PROCESS WINDOW FOR ADJUSTMENT OF MANUFACTURING TOOL

BACKGROUND

Technical Field

The present disclosure relates to integrated circuits (ICs). More specifically, the present disclosure relates to processes for creating a plurality of representative contours from a manufactured circuit, and then generating a risk inventory and common process window (CPW) for the manufactured circuit. The risk inventory and CPW may be used to adjust a manufacturing tool for creating the manufactured circuit and/or other circuits.

Related Art

Fabrication foundries ("fabs") may manufacture ICs using photolithographic processes. Photolithography is an optical printing and fabrication process by which patterns on a photolithographic mask (i.e., photomask) are imaged and defined onto a photosensitive layer coating of a substrate. To manufacture an IC, photomasks are created using a specification, including an IC layout, as a template. The photomasks contain the various geometries of the IC layout, and these geometries may be separated with layers of photoresist material. The various geometries contained on the photomasks correspond to the various base physical IC elements that make up functional circuit components such as transistors, interconnect wiring, via pads, as well as other elements that are not functional circuit elements but are used to facilitate, enhance, or track various manufacturing processes. Through sequential use of the various photomasks corresponding to a given IC in an IC fabrication process, a large number of material layers of various shapes and thicknesses with different conductive and insulating properties may be built up to form the overall IC and the circuits within the IC layout.

As integrated circuit (IC) components have continued to decrease in size, improvements to scale have spawned design implementation issues for some types of geometries, e.g., in complementary metal-oxide-semiconductor (CMOS) ICs with geometries sized less than approximately twenty-two nanometers (nm). As IC technology continues to shrink, the growing need for empirical data from a design may exacerbate the uncertainty of the manufacturing process, thereby increasing the risk of defects or impaired operability. Conventional approaches for traversing physical limits may apply manual or computer-implemented techniques for increasing the resolution of chips printed using optical lithography. One such technique is known as optical proximity correction (OPC). OPC is a computational method for correcting irregularities and distortions arising from diffraction effects by the transforming of mask geometries. Further techniques may include optical rule check (ORC) for comparing a product specification for the circuit against variable processing conditions.

Automated techniques for modeling and identifying defects and/or sensitive portions of a circuit's specification may be inherently limited by the need to have a user visually search for defects, problem areas, etc., in a manufactured circuit. Current processing methodology requires a user to visually identify sensitive portions and/or product defects in an actual product by inspecting images of the manufactured circuit. Visual inspection is conventionally needed to identify problem areas not previously identified in a model for the product. Manufacturing control and adjustment based on visual inspection, however, increases the amount of money and time consumed during testing.

SUMMARY

A first aspect of the disclosure provides a method including: converting an image of a manufactured circuit to a plurality of representative contours, the plurality of representative contours corresponding to printed features in the manufactured circuit; generating a risk inventory for the manufactured circuit based on the plurality of representative contours, the risk inventory being configured to identify at least one process sensitive geometry (PSG) in the manufactured circuit; generating a common process window (CPW) for the manufactured circuit based on the plurality of representative contours and the risk inventory, the CPW being indicative of manufacturing reliability of each feature in the manufactured circuit; and generating instructions to adjust a manufacturing tool for creating the manufactured circuit, based on the generated CPW.

A second aspect of the disclosure provides a computer program product stored on a computer readable storage medium, the computer program product comprising program code, which, when being executed by at least one computing device, causes the at least one computing device to: convert an image of a manufactured circuit to a plurality of representative contours, the plurality of representative contours corresponding to printed features in the manufactured circuit; generate a risk inventory for the manufactured circuit based on the plurality of representative contours, the risk inventory being configured to identify at least one process sensitive geometry (PSG) in the manufactured circuit; generate a common process window (CPW) for the manufactured circuit based on the plurality of representative contours and the risk inventory, the CPW being indicative of manufacturing reliability of each feature in the manufactured circuit; and generate instructions to adjust a manufacturing tool for creating the manufactured circuit, based on the generated CPW.

A third aspect of the present disclosure provides a system including at least one computing device configured to perform a method by performing actions including: converting an image of a manufactured circuit to a plurality of representative contours, the plurality of representative contours corresponding to printed features in the manufactured circuit; generating a risk inventory for the manufactured circuit based on the plurality of representative contours, the risk inventory being configured to identify at least one process sensitive geometry (PSG) in the manufactured circuit; generating a common process window (CPW) for the manufactured circuit based on the plurality of representative contours and the risk inventory, the CPW being indicative of manufacturing reliability of each feature in the manufactured circuit; and generate instructions to adjust a manufacturing tool for creating the manufactured circuit, based on the generated CPW.

Figure 1:
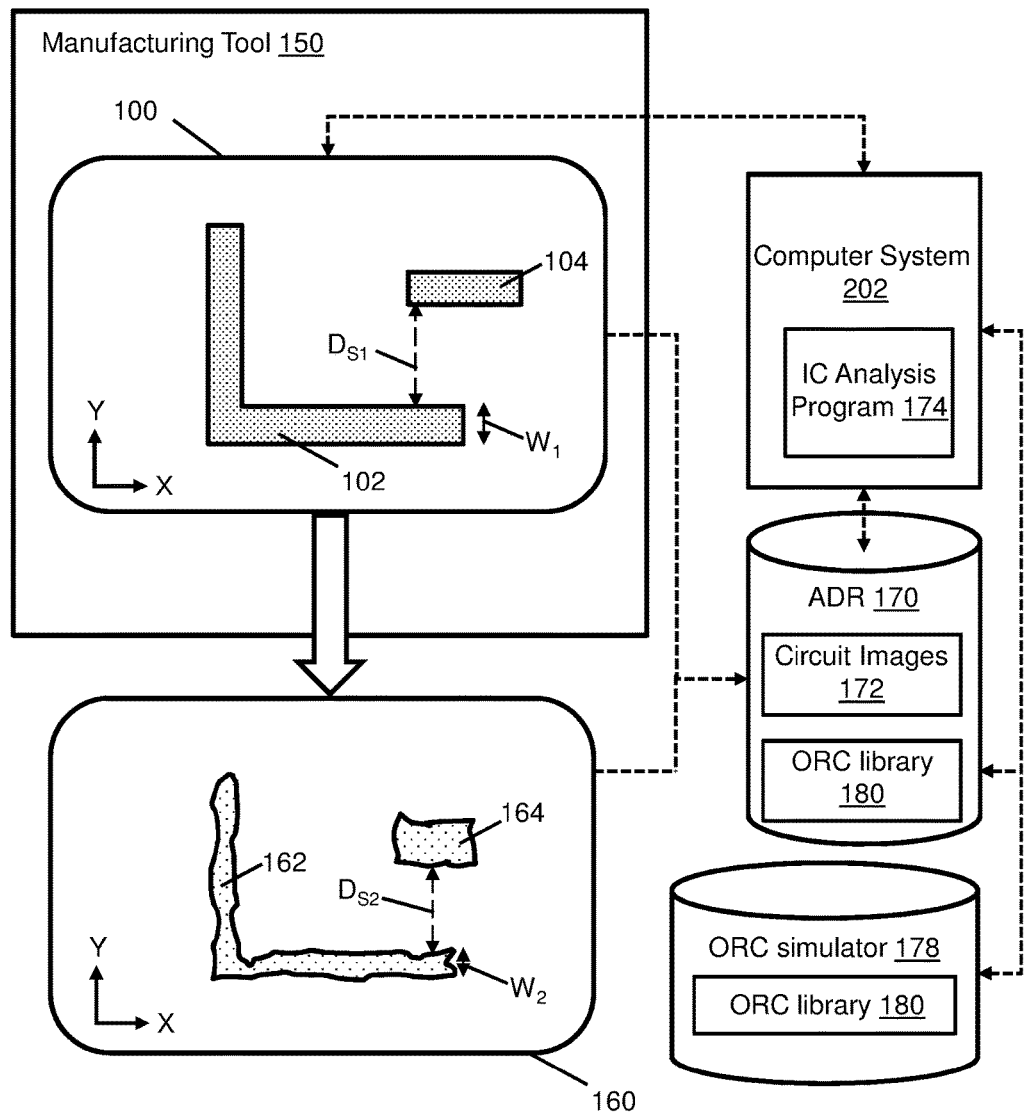
FIG. 1 provides a schematic data flow diagram of components and processes for generating a risk inventory and common process window (CPW) for a manufactured circuit according to embodiments of the disclosure.

It is noted that the drawings of the disclosure are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Introduction and General Definitions

Embodiments of the disclosure rely upon image processing techniques to automate various aspects of integrated circuit (IC) (alternatively, "circuit") manufacture. More specifically, embodiments of the disclosure convert images of a manufactured circuit into representative contours, and automatically use these representative contours to generate a risk inventory and common process window (CPW) for identifying process sensitive geometries (PSGs) and the manufacturing reliability of the circuit. The method further includes generating instructions to adjust a manufacturing tool based on the generated CPW, and/or adjusting the manufacturing tool(s) using the generated instructions.

To better illustrate the various embodiments of the present disclosure, particular terminology which may be known or unknown to those of ordinary skill in the art is defined to further clarify the embodiments set forth herein. The term "system" may refer to a computer system, server, etc., composed wholly or partially of hardware and/or software components, one or more instances of a system embodied in software and accessible a local or remote user, all or part of one or more systems in a cloud computing environment, one or more physical and/or virtual machines accessed via the Internet, other types of physical or virtual computing devices, and/or components thereof.

The term "specification" may refer to a site list, digital rendering, and/or similar pre-manufacture representation of the layout for a complete or partial IC chip which includes a plurality of circuit geometries which may be stored, e.g., in a memory component of a computer system. A "region" refers to any subset of a given specification. A "pattern" refers to a representation of one or more elements in a specification, which may be transferred from the memory of a computer system onto a mask by way of, for example, direct-write electron beam lithography. Optical proximity correction (or "OPC") generally refers to a process by which a specification is simulated for printing by converting a set of ideal patterns into corrected shapes to account for one or more printing errors. Optical rule checking (or "ORC") refers to analyzing of a simulated aerial image of a particular specification under multiple process variants (e.g., light intensity, image contrast at edges, etc.) to predict which portions of an IC structure are most sensitive to manufacturing variations.

A "geometry" or "pattern geometry" refers to an estimated printing region of a given pattern in an OPC simulation, which may account for printing errors or related constraints. A "process-sensitive geometry (PSG)," sometimes identified as a "weak point" or "hotspot," refers to a geometry in a specification with an elevated sensitivity to manufacturing variations, and/or risk of pinching or bridging defects, relative to manufacturing requirements. PSGs may pose a risk to the quality of a product if manufacturing constraints such as light intensity vary significantly from their nominal or expected values. A "risk inventory" may include any listing, database, illustration, etc., for representing the presence of PSGs in a manufactured circuit, and may differ from other representations of PSGs which are specific to the simulated and/or predicted attributes of a specification or non-manufactured circuit. A "common process window (CPW)," also known as a "process window index" or simply as "process window," refers to a plot of manufacturability for an entire IC as compared to variations in exposure dose, depth of focus, and/or other manufacturing variables. The CPW referenced herein may be distinguished from other process window quantifications, e.g., selective process windows, by representing the manufacturability of an entire IC product as opposed to specific regions of the product. A "critical dimension" refers to the smallest acceptable separation distance between two elements of a particular region, below which the elements cannot be reliably printed to a wafer or mask.

Circuit Manufacture with ORC Library

FIG. 1 provides schematic a schematic data flow diagram of components and processes for computer-aided circuit manufacture according to embodiments of the disclosure. FIG. 1 illustrates a specification 100 indicative of at least a portion, in plane X-Y, of a product to be simulated and manufactured using optical proximity correction (OPC) and optical rule checking (ORC). Specification 100 may include patterns 102, 104 to be printed at respective positions. Although two patterns 102, 104 are shown in specification 100 for the purposes of demonstration, it is understood that specification 100 of FIG. 1 may represent only a portion of a larger IC layout to be printed. More specifically, specification 100 depicted in FIG. 1 may represent a single region of specification 100. Each region of specification 100 may include multiple patterns 102, 104 which are in close physical proximity relative to other patterns, and/or may be functionally interrelated or designed to be manufactured together. In some cases, specification 100 may include only a select group of regions and associated patterns 102, 104 which may provide a group of empirical data for OPC modeling and/or ORC simulation. Each pattern 102, 104 in specification 100 may include corresponding widths in plane X-Y, e.g., $W_1$ of pattern 102. Patterns 102, 104 may be spaced apart, e.g., by a respective separation distance $D_{S1}$ along a corresponding axis (shown along Y-axis for the sake of example).

A manufacturing tool 150 (e.g., a single manufacturing plant and/or a group of interconnected devices for producing a manufactured circuit 160 from a proposed layout) may be operable to receive specification 100 and yield manufactured circuit 160 based on specification 100. Manufactured circuit 160 may include one or more printed patterns 162, 164 formed based on, e.g., pattern(s) 102, 104 of specification 100. Manufacturing tool 150 may be operable to, e.g., cause manufacture of one or more printed patterns 162, 164 at positions designated with patterns 102, 104 in specification 100. As shown, printed patterns 162, 164 may vary in size, shape, etc., from their corresponding patterns 102, 104 in specification 100. Structural differences between patterns 102, 104 and printed patterns 162, 164 may be caused by processing variants, e.g., differences in light intensity, the position and operation of various components in manufacturing tool 150, proximity effects from other patterns in specification 100, etc. Printed patterns 162, 164 may also have, e.g., an X-Y width $W_2$ and separation distance $D_{S2}$ along Y-axis, which may be similar to or different from separation distance $D_{S1}$ and/or width $W_1$ in specification 100.

Systems according to the disclosure may include an analysis data repository (simply "ADR" hereafter) 170 of circuit images 172 corresponding to various specifications 100 and/or manufactured circuits 160, and which may include representations of patterns 102, 104 and/or printed patterns 162, 164. In accordance with embodiments of the disclosure, ADR 170 is connected to, and modified by an IC analysis program 174 including, e.g., one or more systems for analyzing and interpreting circuit images 172 as discussed herein. IC analysis program 174 may be housed, e.g., in a computer system 202, and the various systems and modules therein may operate through one or more processing techniques described herein. Computer system 202 may be in communication with ADR 170, e.g., according to any currently-known or later developed solution for communicating between data repositories (e.g., ADR 170), computer systems (e.g., computer system 202), and/or other data repositories discussed herein.

An ORC simulator 178 may be communicatively coupled to ADR 170 and IC analysis program 174 of computer system 202, e.g., to yield and interpret simulations of how processing variances may affect manufactured circuits 160. Although ORC simulator 178 is shown by example to be a distinct device and/or component with respect to computer system 202, it is understood that ORC simulator 178 may be included as part of computer system 202 in various embodiments. ORC simulator 178 may use specification(s) 100 and/or circuit images 172 to generate one or more conditions and add the variously generated conditions to ORC libraries 180, e.g., simulated aerial images of circuits to be manufactured from specification(s) 100. ORC libraries 180 may embed various forms of data in the simulated images, e.g., to identify portions of specification 100 which may be particularly sensitive to processing variations, e.g., light intensity, image contrast at edges, etc. More specifically, some portions of specification 100 may be prone to pinching (i.e., reduced pattern widths affecting circuit operation), bridging (i.e., inadvertent electrical connection between patterns caused by expanded widths and/or reduced separation distance) or other defects as a result of processing variations. Embodiments of the disclosure may use or adjust ORC libraries 180 to identify known process-sensitive geometries (PSGs) in each specification 100 before automatically identifying other PSGs in manufactured circuits.

Figure 2:
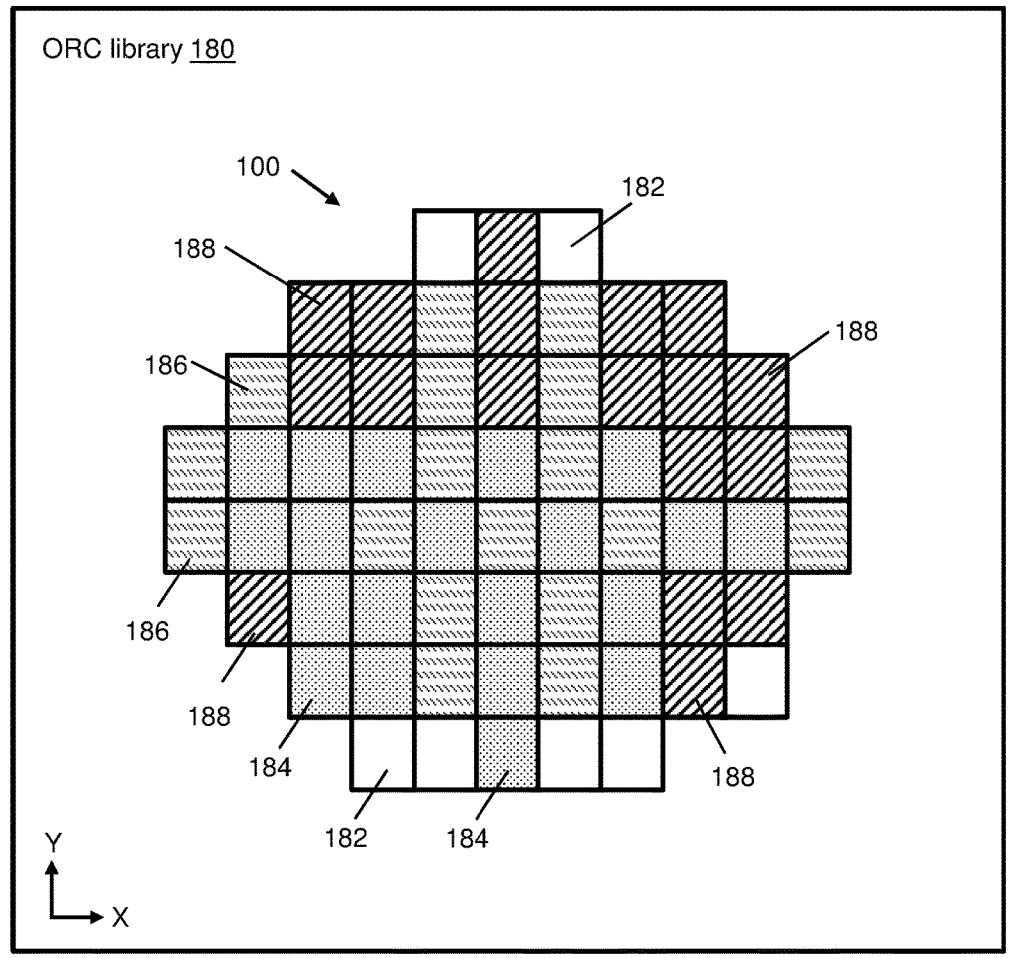
FIG. 2 depicts an example of an ORC library for a specification according to embodiments of the disclosure.

Referring to FIG. 2, an ORC library 180 generated by ORC simulator 178 (FIG. 1) in embodiments of the disclosure is shown. ORC library 180, upon being generated, may be stored locally in ORC simulator 178 and/or transmitted to ADR 170 (FIG. 1) for storage therein. As described elsewhere herein, embodiments of the disclosure may allow computer system 202 (FIG. 1) and ORC simulator 178 to account for the presence of PSGs in manufactured circuit(s) 160 which cannot be identified solely from specification 100 (FIG. 1). As shown, ORC library 180 may provide a simulated aerial view of specification 100, e.g., in plane X-Y, to predict whether portions of specification 100 are susceptible to processing variations during manufacture. Specification 100 may represent an entire product, with each pattern 102, 104 (FIG. 1) to be manufactured included therein. Although ORC library 180 is shown within plane X-Y in FIG. 2, it is understood that ORC library 180 may model multiple layers of a particular layout and/or may depict specification 100 in a different two-dimensional plane and/or in three-dimensional space.

ORC library 180 may be subdivided into multiple regions 182 representing portions of specification 100 and corresponding patterns (e.g., patterns 102, 104 (FIG. 1)). Thus, each region 182 of ORC library 180 may include any conceivable number of patterns 102, 104 to be analyzed under different processing variations. When constructing ORC library 180, ORC simulator 178 (FIG. 1) may calculate, determine, and/or otherwise obtain a group of processing constraints pertaining to specification 100 and/or each region 182 therein. The various processing constraints may include proposed threshold values, minimum and maximum qualifications for non-sensitivity, analytical techniques, etc., for defining various limits for pattern 102, 104 of specification 100 during manufacture. For example, ORC simulator 178 may define a minimum pattern width, a minimum separation distance between patterns, a minimum surface area of patterns within a given surface area, and/or a minimum amount of space between device layers, mask error enhancement factor, normalize image log slope, etch bias, CMP caused variance, topography caused effect, etc., for estimating the manufacturability of specification 100.

The usefulness of ORC library 180 may be directly dependent upon the processing constraints for particular specifications 100, the reference data (e.g., simulated circuits and/or actual products) used to predict whether patterns 102, 104 in each region 182 are likely to violate the processing constraints under different processing conditions. ORC library 180 may predict whether regions 182 and any patterns 102, 104 are susceptible to process variations based on whether any processing constraints are violated during a simulated circuit manufacture. To this extent, ORC library 180 may compile the results of simulated circuit manufacture under different process variations, e.g., increased light intensity, reduced light intensity, varied edge contrast of manufacturing tools, post etch simulation, post CMP simulation, varied amounts of focus and/or other processing characteristics, etc. ORC library 180 may apply simulated and actual data to each region 182 in ORC library 180 to determine whether varied (i.e., non-ideal) processing conditions will pose a risk of violating the predetermined processing constraints. Each form of data used to test regions 182 in ORC library 180 may be verified with structural image representations of actual manufactured products, e.g., lithography scanning electron microscope (SEM) images, etch SEM images, electrical testing, etc.

It is therefore understood that ORC library 180 can, for a single region 182, simultaneously evaluate processing under maximum light intensity, minimum light intensity, focus, variants caused from different types of etching and/or processing, etc., to mathematically predict whether each region 182 is sensitive to such variations during manufacture. ORC library 180 may deem some regions as being non-sensitive regions 184, e.g., due to the actual and simulated processing variations causing no significant change to the manufacture of patterns 102, 104 formed in those regions. Other regions 182 may have greater sensitivity to the various processing variations simulated or shown in training data for ORC library 180. ORC library 180 may optionally designate other regions 182 of the IC layout in specification 100 as being minimally sensitive regions 186, e.g., by including geometries which form with significant variations under different processing conditions, yet pose little risk of violating the previously-calculated processing constraints for specification 100. The amount of risk may correspond to, e.g., a percentage of manufactured or simulated circuits which violate the processing constraints for a product and may include, e.g., a maximum of five percent, ten percent, twenty percent, etc., of all test cases. ORC library 180 may also include regions 182 determined to include process-sensitive geometries (PSGs), and thus may identify a set of PSG regions 188. PSG regions 188 of ORC library 180 represent regions which are likely to violate the previously calculated processing constraints under the different processing variations, and are likely to cause operational errors and/or variations from pinching, bridging, and/or other misprinting events. Thus, regardless of how many simulated or actual test cases are used to test each region 182 in ORC library 180, the usefulness of ORC library 180 will be limited in cases where the processing constraints have been miscalculated and/or do not fully correspond to the actual characteristics of specification 100.

Returning briefly to FIG. 1, a computer system 202 can aid in the production of manufactured circuits 160 by converting circuit images 172 into a set of representative contours, and generating a risk inventory and common process window (CPW) for specification 100. IC analysis program 174 may perform such functions, e.g., by processing data from ORC libraries 180 for specification 100 and/or different specifications. IC analysis program 174 may use the generated risk inventory and CPW 196 to generate instructions for adjusting manufacturing tool(s) 150. Manufacturing tool(s) 150 may thereafter produce manufactured circuit 160 based on specification 100, the generated instructions, and/or other processing requirements. Further details regarding the generated risk inventory and common process window are discussed before proceeding to additional details computer system 202.

Overview of Risk Inventory and Common Process Window

Conventional analysis of manufactured circuits 160 for processing errors, continued manufacturability, and/or other physical characteristics requires manual analysis by a user. Such analysis may include a visual inspection of microscopic images to identify, diagnose, and correct PSGs which did not occur during prior quantitative and/or inferential analysis of specification 100 for manufactured circuit 160. Visual analysis of manufactured circuits 160 may include constructing an inventory of possible defects and/or PSGs in manufactured circuits 160 by inspecting the physical appearance of manufactured circuit 160. By comparing manufactured circuit(s) 160 to predetermined constraints, manufacturing variances, etc., analyzing manufactured circuit(s) 160 can include constructing a common process window (CPW) to indicate the manufacturing reliability of manufactured circuit 160.

Figure 3:
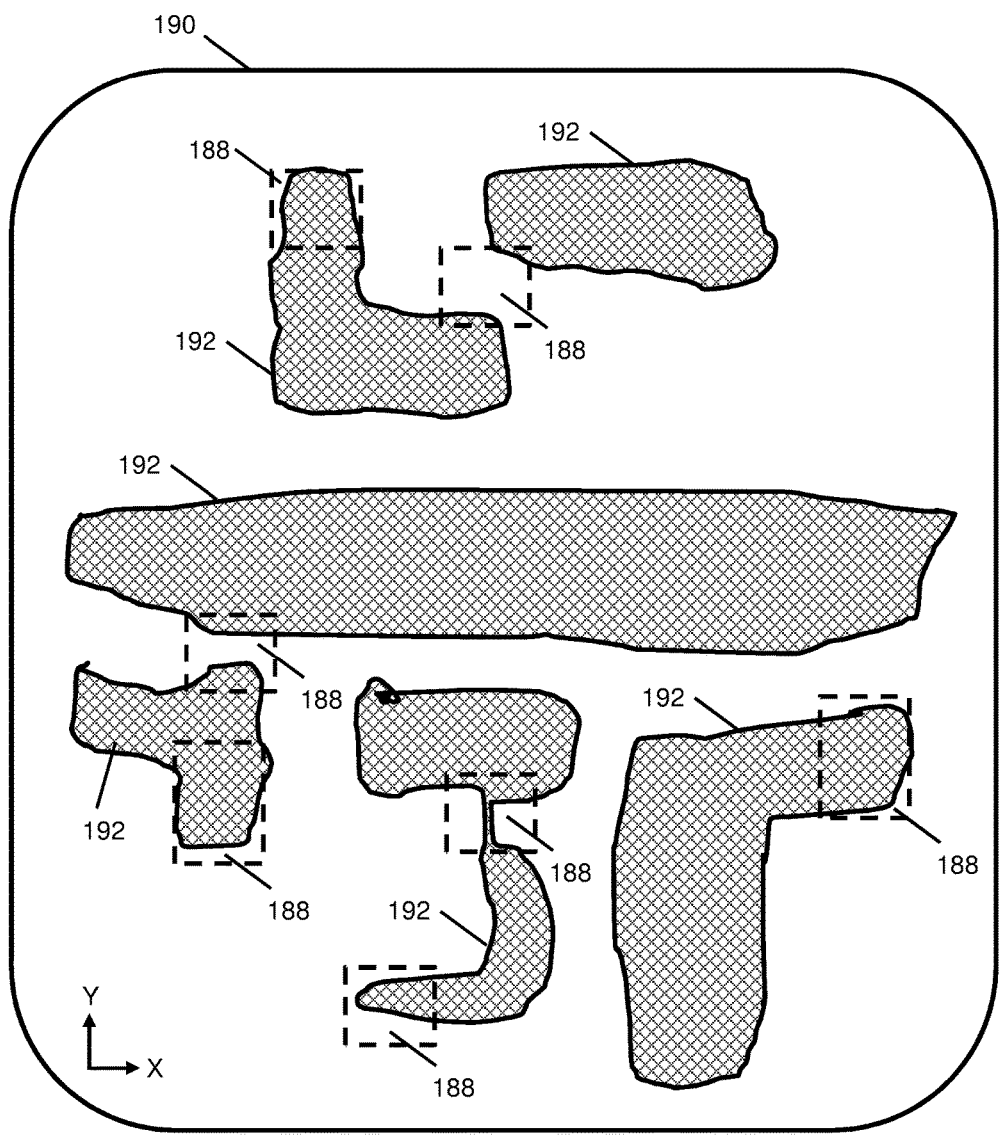
FIG. 3 depicts an example set of representative contours and risk inventory generated for a manufactured circuit according to embodiments of the disclosure.

Referring to FIG. 3, embodiments of the disclosure can generate a risk inventory 190 containing a plurality of representative contours 192, each of which may represent one printed pattern 162, 164 (FIG. 1) in manufactured circuit 160 (FIG. 1). Plurality of representative contours 192 are included merely to provide an example illustration, and do not necessarily indicate the total number of individual contours which may be included in a plurality of representative contours. Representative contours 192 can be generated pursuant to any currently known or later developed technique for extracting representative contours from manufactured circuit 160 such as but not limited to, e.g., detecting sets of coarse edges within circuit image(s) 172 (FIG. 1), filtering noise and/or other artifacts from the image to remove structures not pertaining to manufacturability, mapping the detected edges onto a two dimensional space, and constructing the contour representation from the result of such processes. In conventional processes, risk inventory 190 can be generated by visually inspecting a SEM-generated or other microscopy-generated image of manufactured circuit(s) 160, visually identifying regions which exhibit a significant risk of bridging or pinching, and then marking off such regions as PSG region(s) 188 following the visual inspection. Embodiments of the disclosure provide an operational methodology for automatically identifying PSG region(s) 188 based on the characteristics shown in plurality of representative contours 192.

Risk inventory 190 for manufactured circuit 160 (FIG. 1) may include actual defects (e.g., pinching or bridging), or structures which exhibit a higher sensitivity to processing variations. Such regions can be identified in plurality of contours 192 as PSG regions 188 to indicate regions of manufactured circuit 160 with a higher risk of defects and/or manufacturing variance under different processing conditions. In conventional processing PSG regions 188 can be identified by manually inspecting circuit images 172 (FIG. 1) of manufactured circuits 160. In processes according to the disclosure, IC analysis program 174 can automatically identify PSG regions 188 in manufactured circuit 160 by comparing individual representative contours to predetermined values, e.g., minimum distance between two features, minimum feature width, etc., to identify PSG regions 188 without intervention by a user. Further details for generating risk inventory 190 from circuit images 172 are discussed elsewhere herein, e.g., regarding operational methodology implemented via IC analysis program 174.

Figure 4:
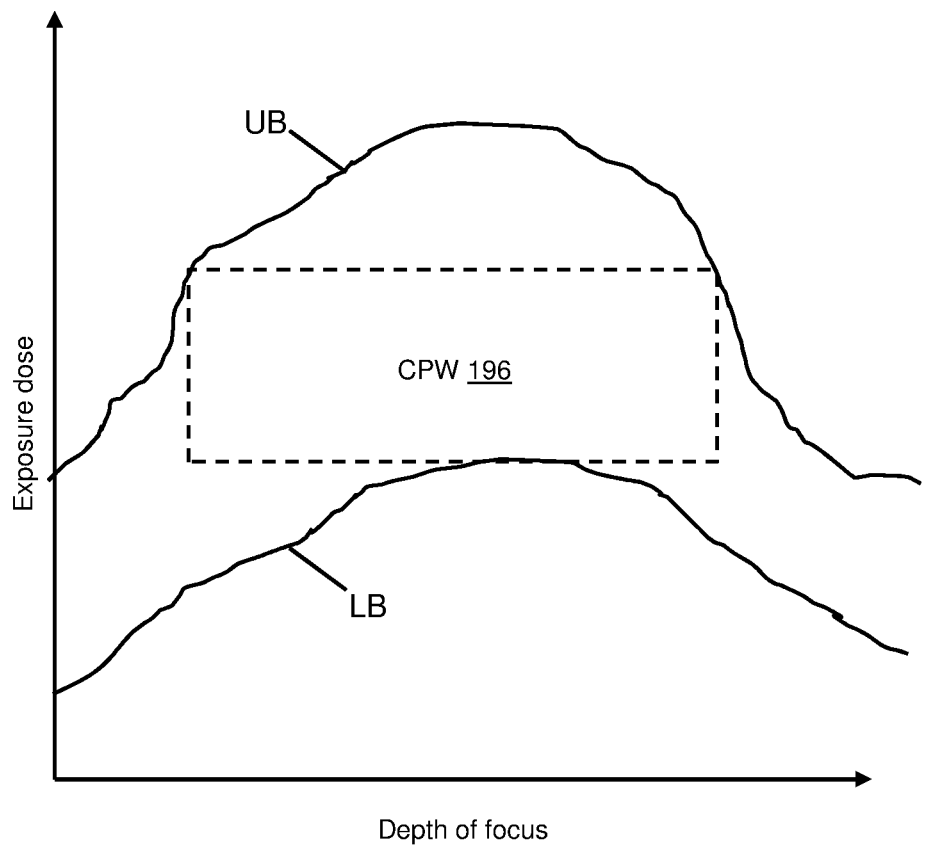
FIG. 4 depicts an example CPW generated for a manufactured circuit according to embodiments of the disclosure.

Tuning briefly to FIG. 4, an example of a CPW 196 generated with IC analysis program 174 (FIG. 1) according to embodiments of the disclosure is shown. CPW 196, when constructed based on a visual analysis of manufactured circuit 160 (e.g., through direct observation of microscopic images), can illustrate a range of preferred manufacturing settings (e.g., depth of focus) regardless of variability in other manufacturing fluctuations, (e.g., variations in exposure dose). CPW 196 is shown as being defined as a region bounded on a plot of exposure dose Y axis) and depth of focus (on X axis) curves, corresponding to the dependent variable (e.g., exposure dose) profile at maximum ("UB") and minimum ("LB") critical dimension (CD) values of manufactured circuit 160 (FIG. 1). Exposure dose is dependent upon the light intensity and the scanning speed of the wafer during manufacture. Depth of focus refers to a predetermined defocus range which offers acceptable manufacturing performance. The need to comply with larger CD values will generally require higher exposure dose and depth of focus values as compared to lower CD values. The two profiles UB and LB thereby illustrate the relationship between exposure dose and depth of focus for minimum and maximum CD values.

The area enclosed by curves LB and UB indicates CPW 196 for a product, which in turn indicates the ranges of exposure dose and depth of focus which enable manufacturability of the product. As shown in CPW 196, the lithographic settings included therein for a particular CD value will provide acceptable manufacturability of the product. Due to the asymmetric shape and size of CPW 196 relative to all possible settings, the CD value at the center of CPW 196 will not necessarily be equal to the target CD value for a product under analysis.

As noted in the discussion of IC analysis program 174, below, embodiments of the disclosure provide operational methodologies to generate risk inventory 190 and CPW 196 for manufactured circuits 160 without manual intervention. The operational methodologies described herein can generate instructions 206 for adjusting manufacturing tool(s) 150. A possible setting for implementing IC analysis program 174 is provided herein to further illustrate technical features of the disclosure and mechanisms for generating risk inventory 190 and CPW 196 according to the disclosure.

Computer System and Example Components

Figure 5:
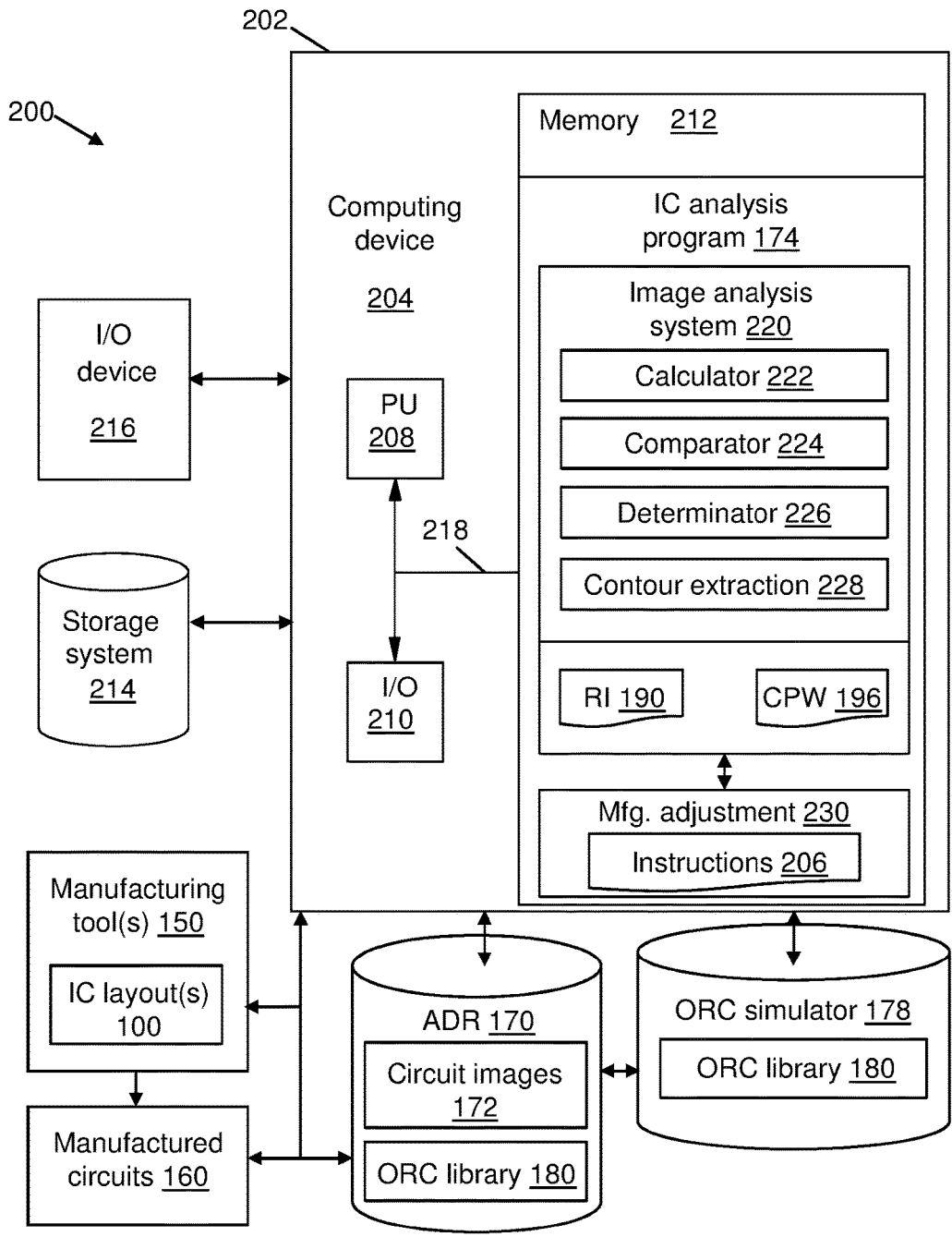
FIG. 5 depicts an illustrative environment, which includes a computer system configured to interact with a manufacturing tool, analysis data, and ORC simulator to generate a risk inventory and CPW according to embodiments of the disclosure.

Referring to FIG. 5, an illustrative environment 200 for implementing the methods and/or systems described herein is shown. In particular, a computer system 202 is shown as including computing device 204. Computing device 204 may include, e.g., an IC analysis program 174 which may include, e.g., one or more sub-systems (image analysis system 220, manufacturing adjustment system (abbreviated as "mfg. adjustment" in FIG. 5) 230 for performing any/all of the processes described herein and implementing any/all of the embodiments described herein.

Computer system 202 is shown including a processing unit (PU) 208 (e.g., one or more processors), an I/O component 210, a memory 212 (e.g., a storage hierarchy), an external storage system 214, an input/output (I/O) device 216 (e.g., one or more I/O interfaces and/or devices), and a communications pathway 218. In general, processing unit 208 may execute program code, such as IC analysis program 174, which is at least partially fixed in memory 212. While executing program code, processing unit 208 may process data, which may result in reading and/or writing data from/to memory 212 and/or storage system 214. Pathway 218 provides a communications link between each of the components in environment 200. I/O component 210 may comprise one or more human I/O devices, which enable a human user to interact with computer system 202 and/or one or more communications devices to enable a system user to communicate with the computer system 202 using any type of communications link. To this extent, IC analysis program 174 may manage a set of interfaces (e.g., graphical user interface(s), application program interface(s), etc.) that enable system users to interact with IC analysis program 174. Further, IC analysis program 174 may manage (e.g., store, retrieve, create, manipulate, organize, present, etc.) data, through several modules contained within an image analysis system 220 and/or manufacturing adjustment system 230. Image analysis system 220 and manufacturing adjustment system 230 are shown by example as being sub-systems of IC analysis program 174. However, it is understood that image analysis system 220 and manufacturing adjustment system 230 may be wholly independent systems.

As noted herein, IC analysis program 174 may include image analysis system 220 and manufacturing adjustment system 230. In this case, modules 222, 224, 226, 228, of image analysis system 220 may enable computer system 202 to perform a set of tasks used by IC analysis program 174, and may be separately developed and/or implemented apart from other portions of IC analysis program 174. Calculator 222 can implement various mathematical computations in processes discussed herein. Comparator 224 can compare two quantities and/or items of data in processes discussed herein. Determinator 226 can make logical determinations based on compliance or non-compliance with various conditions in processes discussed herein. Contour extraction module (abbreviated as "contour extraction" in FIG. 5) 228 can include one or more formulas, steps, algorithms, etc., for automatically converting circuit images 172 into corresponding sets of contours 192 to be analyzed according to the disclosure. One or more modules 222, 224, 226, 228, may use algorithm-based calculations, look up tables, software code, and/or similar tools stored in memory 212 for processing, analyzing, and operating on data to perform their respective functions. Each module discussed herein may obtain and/or operate on data from exterior components, units, systems, etc., or from memory 212 of computing device 204. IC analysis program 174 can also include data in the form of risk inventory (RI) 190 and/or CPW 196 generated according to the disclosure.

Image analysis system 220 may manipulate, interpret, and analyze various forms of information in ADR 170, including circuit images 172 and/or ORC library 180, to produce representative contours from corresponding images 172 of manufactured circuits 160 as described herein. In addition, image analysis system 220 may generate risk inventory 190 and CPW 196 indicating the manufacturability of specifications 100, various aspects of manufactured circuits 160, etc. In further embodiments, manufacturing adjustment system 230 may produce various outputs (e.g., instructions 206) based on risk inventory 190 and CPW 196. ADR 170 can be communicatively coupled to computing device 205 through any individual or combination of physical and/or wireless data coupling components discussed herein. Some attributes of specification 100 may be converted into a data representation (e.g., a data matrix with several values corresponding to particular attributes) and stored electronically, e.g., within memory 212 of computing device 204, storage system 214, and/or any other type of data cache in communication with computing device 204.

Images and/or other representations of specification 100, manufactured circuit 160, etc., may additionally or alternatively be converted into data inputs or other inputs to IC analysis program 174 with various scanning or extracting devices, connections to independent systems (e.g., ORC simulator 178), and/or manual entry of a user. As an example, e.g., ORC simulator 178 and/or a user of computing device 204 may submit circuit images 172, ORC libraries 180, and/or other forms of information to IC analysis program 174. Following embodiments of the processes discussed herein IC analysis program 174 of computing device 204 can output instructions 206 based on risk inventory 190, CPW 196, etc., for manufactured circuits 160 and in some cases may automatically adjust manufacturing tool(s) 150 based on instructions 206.

Computer system 202 may be operatively connected to or otherwise in communication with manufacturing tool 150 having one or more OPC-based manufacture tools, e.g., an OPC modelor, as part of the image analysis system 220 for generating risk inventory 190 and CPW 196 from a set of representative contours 192 as discussed herein. Computer system 202 may thus be embodied as a unitary device in a semiconductor manufacturing plant coupled to, manufacturing tool 150 and/or other devices, or may be multiple devices each operatively connected together to form computer system 202. Embodiments of the present disclosure may thereby include using IC analysis program 174 to identify (based on ORC libraries 180) where PSGs exist in manufactured circuits 160, which in turn were formed from specification 100. As discussed herein, embodiments of the present disclosure thereby provide instructions for adjusting manufacturing tool(s) 150 based on risk inventory 190 and/or CPW 196, e.g., including location of PSG regions 188 in manufactured circuits 160 produced by manufacturing tool 150.

Where computer system 202 comprises multiple computing devices, each computing device may have only a portion of IC analysis program 174, image analysis system 220 (including, e.g., modules 222, 224, 226, 228), and/or manufacturing adjustment system 230 fixed thereon. However, it is understood that computer system 202 and image analysis system 220 are only representative of various possible equivalent computer systems that may perform a process described herein. Computer system 202 may obtain or provide data, such as data stored in memory 212 or storage system 214, using any solution. For example, computer system 202 may generate and/or be used to generate data from one or more data stores, receive data from another system, send data to another system, etc.

Operational Methodology

Figure 6:
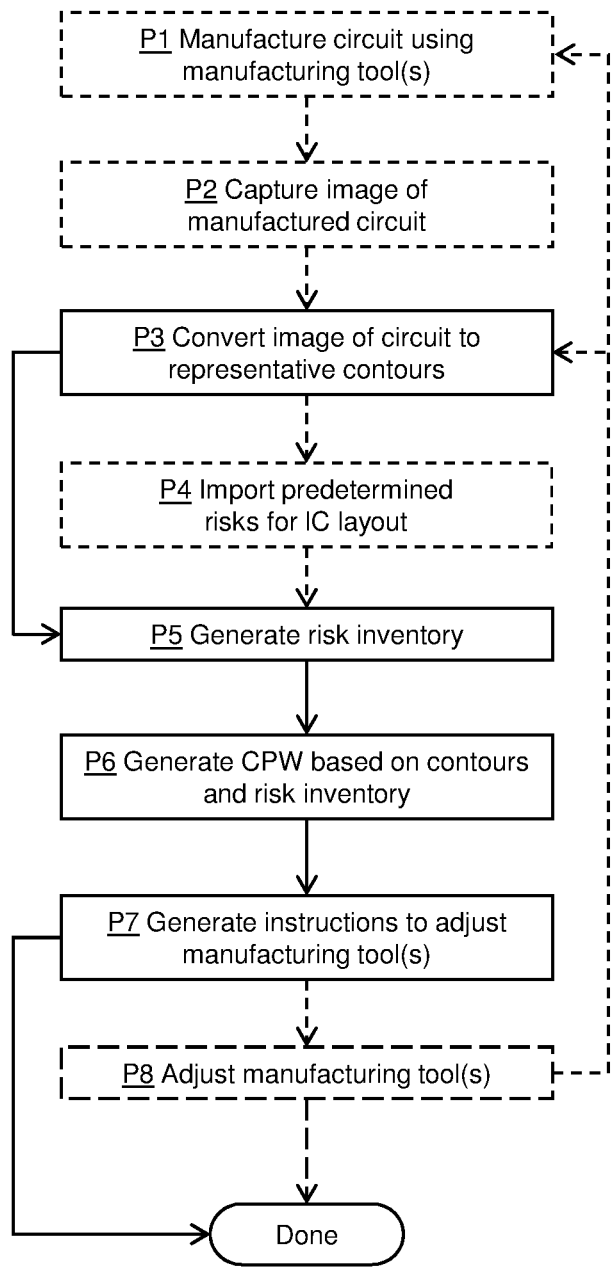
FIG. 6 is an example flow diagram of a method for generating a risk inventory and CPW according to embodiments of the disclosure.

Referring to FIGS. 1, 5, and 6 together, illustrative processes are shown for generating risk inventory 190 and CPW 196, and generating instructions 206, from one or more specifications. The steps and processes depicted in FIG. 6 may be implemented, e.g., with components of IC analysis program 174, one or more modules 222, 224, 226, 228 of image analysis system 220, and/or other components of computer system 202 described herein by example. A single and/or repeated execution of the processes discussed herein may allow for repeated updating of manufacturing tool(s) 150 to account for defects, PSG regions 188 (FIGS. 2-3), etc., in manufactured circuits 160 which cannot be determined from other analyses of specification 100. In the example processes discussed herein, specification 100 will generally be described as including at least two patterns 102, 104 therein, with some alternative examples referring to IC layouts with different numbers of patterns (e.g., one pattern, four patterns, ten patterns, etc.). It is also understood that the present disclosure may be implemented with respect to multiple specifications 100 simultaneously and/or sequentially, with each specification 100 including patterns 102, 104 with any conceivable dimensions, in any conceivable number, etc., and that other examples are discussed herein where appropriate. The various processes discussed herein, furthermore, may be implemented before, after, or during OPC implementation on one or more specifications 100 and/or manufactured circuits 160. The methodology discussed herein may be implemented through alternative embodiments of computer system 202. For example, one ADR 170 may be used for multiple specifications 100 in embodiments of the disclosure. Multiple ADRs 170 and/or IC analysis programs 174 may alternatively be applied to one specification 100. Further alternative examples may include different combinations or numbers of specifications 100, ADRs 170, IC analysis programs 174, etc.

In a preliminary action, methods according to the disclosure can include manufacturing circuit 160 with using manufacturing tool(s) 150, and from a corresponding specification 100 as described herein. Process P1 in some cases may be implemented independently, e.g., by a separate manufacturing entity, before being provided to a circuit analysis entity to implement the analysis techniques described herein. Process P1 is therefore shown in phantom to illustrate this optional process according to embodiments. Each manufactured circuit 160 can include several structures, e.g., printed features 162, 164, therein. Specification(s) 100 may be submitted to manufacturing tool 150 through computer system 202, e.g., as inputs to I/O device 216 through a computer-readable storage medium and/or other computer-readable inputs to computer system 202. Computer system 202, in turn, can instruct manufacturing tool 150 to manufacture circuit(s) 160 according to the information included in specification(s) 100. Specification 100 may be modified before the manufacturing in process P1, e.g., by various conventional processing techniques including OPC, ORC, etc., to reduce the number of projected errors and/or PSG regions 188 before manufacture. In contrast to these techniques, embodiments of the disclosure can analyze manufactured circuit(s) 160 and generate instructions 206 using the properties of manufactured circuit(s) 160.

To analyze the features of manufactured circuit 160, additional preliminary actions may include capturing an image of manufactured circuit 160 in process P2. The captured image may be stored in ADR 170, e.g., as one or more circuit images 172 to be analyzed according to the disclosure. Any currently known or later developed image microscopy technique may be implemented to capture an image of manufactured circuit 160 in process P2. In one example, capturing the image of manufactured circuit 160 can include using a scanning electron microscope (SEM), transmitting electron microscope (TEM), and/or other devices as well as sub-classifications of such devices. Further examples may include applying one or more physical probes (e.g., atomic force microscopy (AFM) probes) for capturing an image of manufactured circuit 160. It is also understood that the various image capture tools discussed herein may be used together and/or with other currently known or later developed technologies to generate circuit images 172 as a composite of multiple images.

Methods according to the disclosure can analyze manufactured circuit 160 by converting circuit images 172 into representative contours 192 (FIG. 3), as discussed herein. At process P3, contour extraction module 228 of image analysis system 220 can accept circuit image(s) 172 as an input, and apply one or more image recognition techniques, processes, algorithms, etc., to convert circuit image(s) 172 into representative contours 192. As discussed elsewhere herein relative to FIG. 7, such processes may include filtering noise and/or other artifacts from circuit image(s) 172, detecting the edges of each printed feature 162, 164, and then mapping representative contours 192 onto locations in a two-dimensional space. Representative contours 192 thus provide a simplified graphical depiction of manufactured circuit 160 similar to the proposed IC layout of specification 100.

Further processes of the disclosure may automatically identify the properties of representative contours 192, after the converting in process P3, to automatically analyze the characteristics of manufactured circuit 160.

Figure 7:
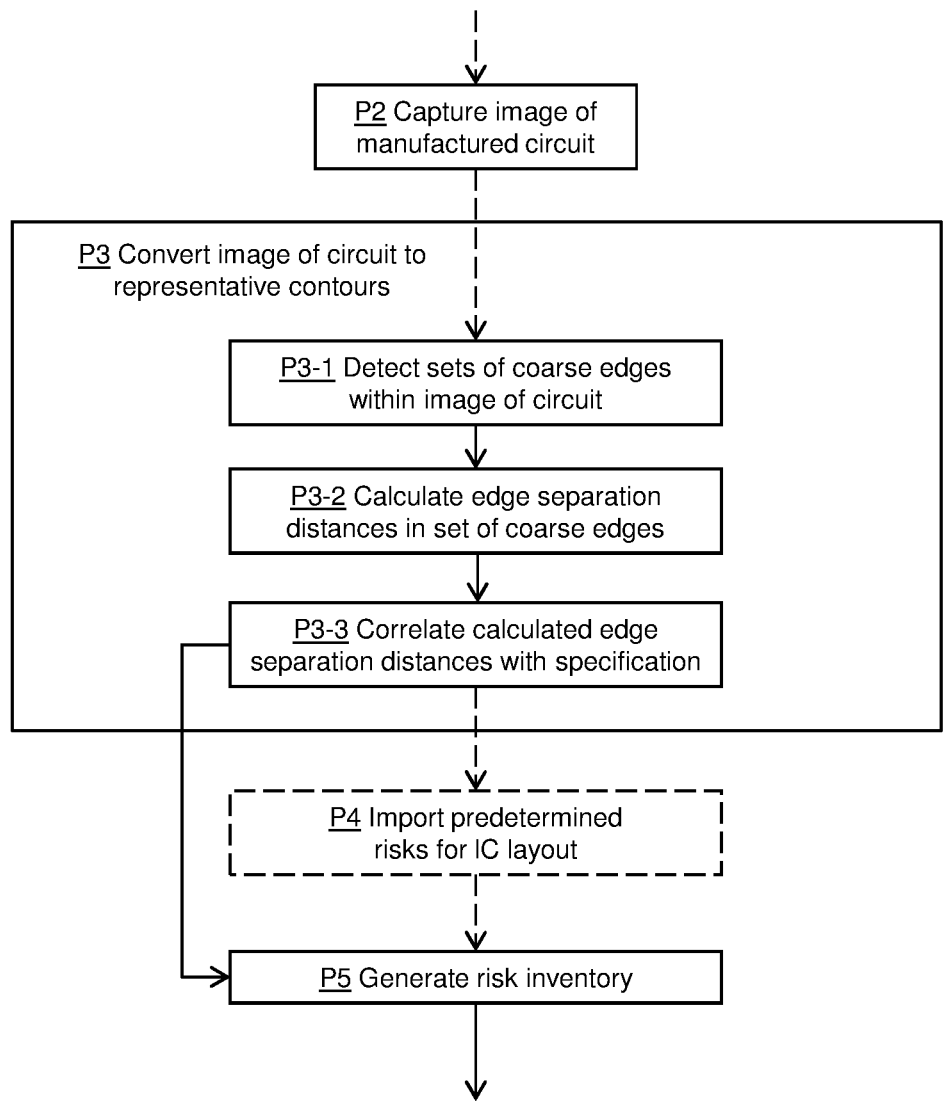
FIG. 7 is an example flow diagram of a method for converting a circuit image to representative contours according to embodiments of the disclosure.
Figure 8:
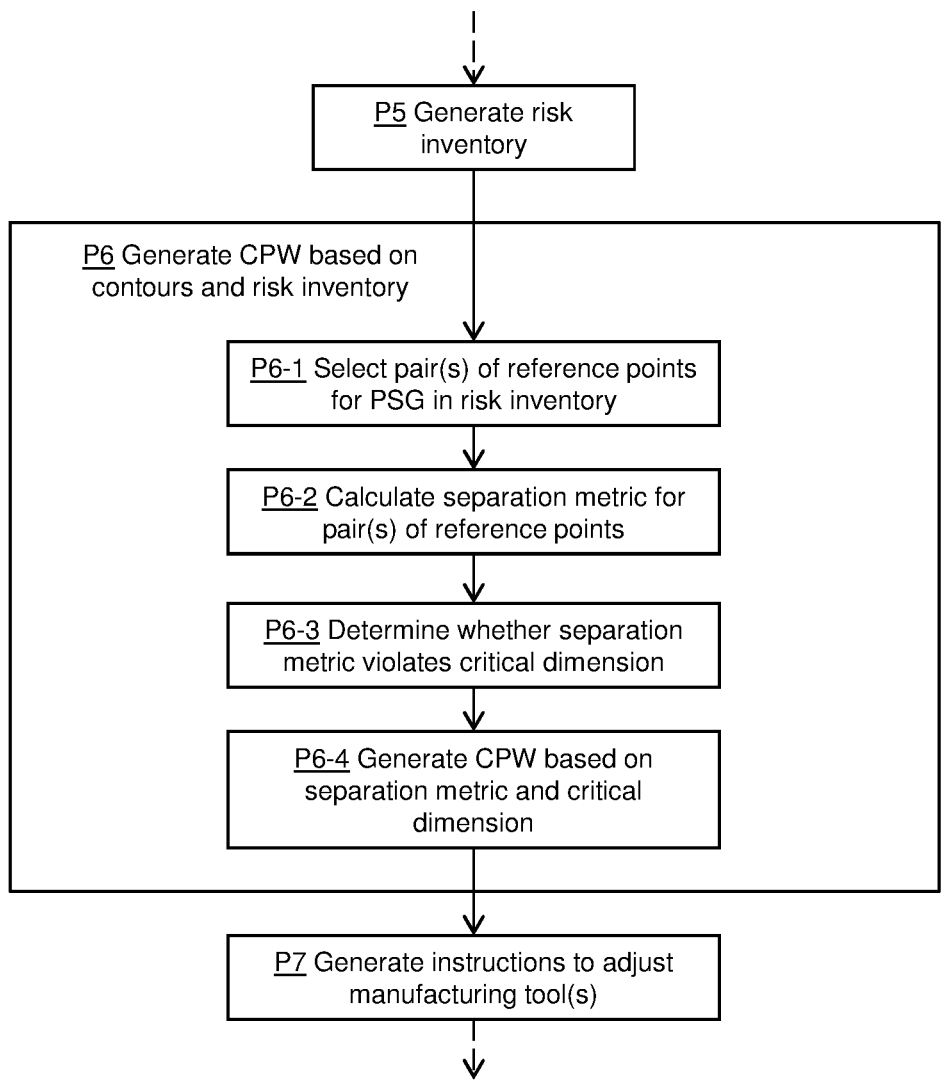
FIG. 8 is an example flow diagram of a method for generating a CPW according to embodiments of the disclosure.

Referring to FIGS. 5 and 7 together, an example set of sub-processes for converting circuit image(s) 172 to representative contours 192 in embodiments of the disclosure is shown. The optional sub-processes P3-1, P3-2, P3-3 shown in FIG. 7 and discussed herein are provided as one example for extracting representative contours 192 from circuit images 172, but it is understood that the various processes discussed herein may be implemented by alternative mechanisms, in different orders, with other steps added and/or omitted, etc. At process P3-1, contour extraction module 228 of image analysis system 220 can detect coarse edges within circuit image(s) 172, e.g., by identifying different textures, shades, etc., in circuit image 172 above a threshold thickness. Such coarse edges may be selected by contour extraction module 228 and compared to threshold values by comparator 224 to identify the location of printed features 162, 164. According to one example, contour extraction module 228 can include an algorithm for detecting feature edges in each circuit image 172 above a threshold thickness (e.g., above five nanometers, ten nanometers, and/or other predetermined threshold values), while ignoring edges and/or image data with a thickness lower than the predetermined threshold. Contour extraction module 228 can then automatically generate a map in two-dimensional space of each detected edge to construct a preliminary representation of manufactured circuit 160 from the detected edges, thereby excluding image artifacts and/or irrelevant information from further processing.

After detecting coarse edges in circuit image(s) 172, the flow may proceed to another sub-process of calculating the separation distances between each coarse edge, i.e., the "edge separation distances" in circuit image 172. Calculator 222 of image analysis system 220 may calculate edge separation distances by any currently known or later developed measurement technique for converting the distance between two points, shapes, regions, etc., in an image to corresponding values in physical space. In some cases, contour extraction module 228 in process P3-2 can simply import the existing measurement and/or edge separation values from a SEM system for generating circuit image(s) 172 without separately calculating the edge separation distances in circuit image(s) 172. However implemented, calculating edge separation distances for the set of coarse edges in process P3-2 can yield a complementary measurement of where printed features 162, 164 are absent in circuit image(s) 172, and how much space should appear between neighboring representative contours 192 in risk inventory 190.

A further sub-process P3-3 according to the disclosure may include using calculator 222 and/or comparator 224 to compare the detected coarse edges and calculated edge separation distances with the projected characteristics of circuit 160 in specification 100. The correlating in process P3-3 may include comparing multiple circuit images 172 for manufactured circuit(s) 160 with specification 100, computing a mathematical average of the location for each coarse edge, edge separation distance, etc., to yield a representative value and position for each representative contour 192. To this extent, it is understood that representative contours 192 may correspond to a single manufactured circuit 160 produced from specification 100, several manufactured circuits 160 produced from one specification 100, and/or other combinations of manufactured circuits 160 or specifications 100. In some cases, the contour extraction techniques described herein may be combined with other currently known or later developed techniques for filtering noise, irrelevant data, and/or image artifacts from circuit images 172, e.g., mathematical transforms, data filtering, etc., The various sub-processes P3-1, P3-2, P3-3 discussed herein thus automatically extract the relevant feature data from circuit images 172 to increase the accuracy of analysis for representative contours 192 in subsequent steps.

Returning to FIGS. 1 and 5-6 together, the disclosure can include referencing known properties of manufactured circuit 160, as set forth in specification 100 and/or ORC library 180, for inclusion in the subsequently generated risk inventory 190. An optional process P4 (shown in phantom) can include importing one or more predetermined risks for the IC layout into image analysis system 220 to aid in future processing. The predetermined risks imported in process P4 may include, e.g., one or more PSG regions 188 previously identified in ORC library 180, regions of specification 100 flagged by purchasers, engineers, etc., as being of greater technical or commercial importance, structures projected as being likely to violate optical rules, and/or other predetermined risks identified in specification 100. In subsequent steps, the predetermined risks imported in process P4 may be automatically added to risk inventory 190 in the event that they are not identified via machine analysis of representative contours 192.

The disclosure can proceed to further analyze of representative contours 192 regardless of whether predetermined risks were previously imported in process P4. Proceeding from process P3 and/or process P4, the disclosure may include generating risk inventory 190 from representative contours 192. As noted elsewhere herein, risk inventory 190 may provide a graphical view, e.g., in a single two-dimensional space, of each representative contour 192 extracted from circuit image(s) 172. The generating of risk inventory 190 may also include comparing the various locations, sizes, etc., of each representative contour 192 against threshold values for these quantities in specification 100 and/or ORC library 180. Representative contours 192 which appear to show a defect, process sensitivity, and/or other manufacturing risk can be flagged in risk inventory 190 as PSG regions 188. As noted herein, some PSG regions 188 may not include actual pinching or bridging defects, but may simply denote a higher risk of such defects occurring during the fabrication of manufactured circuits 160. In embodiments where process P4 is implemented before process P5, risk inventory 190 can also be populated with PSG regions 188 which represent the predetermined risks imported in process P4. In any case, risk inventory 190 can identify at least one PSG region 188 which may affect the future manufacture of circuits 160 from specification 100. The generating of risk inventory 190 in process P5 thus differs from conventional analysis by automatically examining representative contours 192, instead of a manual inspection of circuit image(s) 172.

Continuing to process P6, the techniques discussed herein may automatically provide further analysis of manufactured circuits 160. In particular, image analysis system 220 can generate CPW 196 based on risk inventory 190 and representative contours 192. In contrast to conventional techniques for generating CPW 196, e.g., by visual inspection, the present disclosure can include combining risk inventory 190 with predetermined values for exposure dose, depth of focus, critical dimension, etc. Calculator 222 of image analysis system 220 can yield a plot of such values, based on risk inventory 190, to generate CPW 196 for manufactured circuit 160. Further processing (discussed herein, e.g., with reference to FIGS. 8-11) can include mathematically analyzing the properties of each PSG region 188 in risk inventory 190 to determine whether manufactured circuit 160 will be formed with sufficient reliability under different processing constraints. According to an example, circuit analysis program 174 can calculate the feature width and/or separation distance between each feature in PSG region(s) 188 in plurality of representative contours 192. Circuit analysis program 174 can then determine the relevant values or ranges for exposure dose, depth of focus, etc., during manufacture of manufactured circuit 160. Based on these calculations and determinations, circuit analysis program 174 can automatically determine whether the feature width and/or separation distances comply with critical dimension (CD) values (e.g., are above a minimum value and below a maximum value) required by specification 100 to determine the manufacturability of a product. As noted elsewhere herein, CPW 196 can provide a visual indication of exposure dose, depth of focus, and/or processing values where manufactured circuit 160 will have a sufficient manufacturability, accounting for the maximum and minimum critical dimensions in specification 100.

After risk inventory 190, representative contours 192, and CPW 196 have been generated, process P7 according to the disclosure can include generating instructions 206 to adjust manufacturing tool(s) 150 for creating manufactured circuit(s) 160. Instructions 206 can include one or more actions expressed, e.g., in vector format, for modifying the operation of manufacturing tool(s) 150. Instructions 206 can be based at least in part on CPW 196, and may also directly incorporate information included in risk inventory 190 and/or representative contours 192. The settings of manufacturing tool(s) 150 to be adjusted in process P7 can include the exposure dose, depth of focus, etch time, deposition time, and/or other properties of specification 100.

After generating instructions in process P7, the method flow can terminate (i.e., "Done") after instructions 206 are provided to another system, component, etc., for independent adjusting of manufacturing tool(s) 150. In alternative embodiments, IC analysis program 174 can directly adjust manufacturing tool(s) 150 in process P8 by transmitting instructions 206 directly to manufacturing tool(s) 150. The method flow may then terminate upon adjusting manufacturing tool(s) 150 in process P8, or return to other processes (e.g., process P1, P3, etc., discussed elsewhere herein) along the corresponding process flow shown in phantom.

Figure 9:
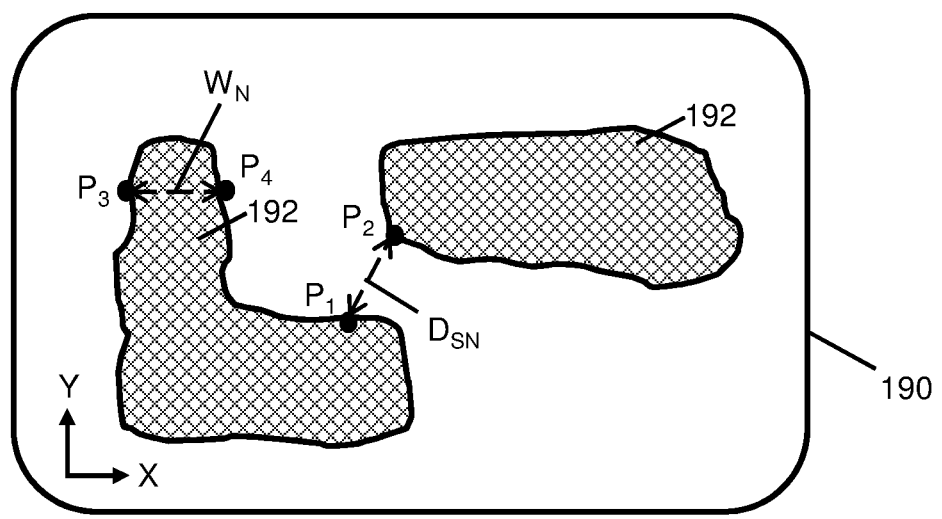
FIG. 9 depicts the calculation of a separation metric via separation distances according to embodiments of the disclosure.
Figure 10:
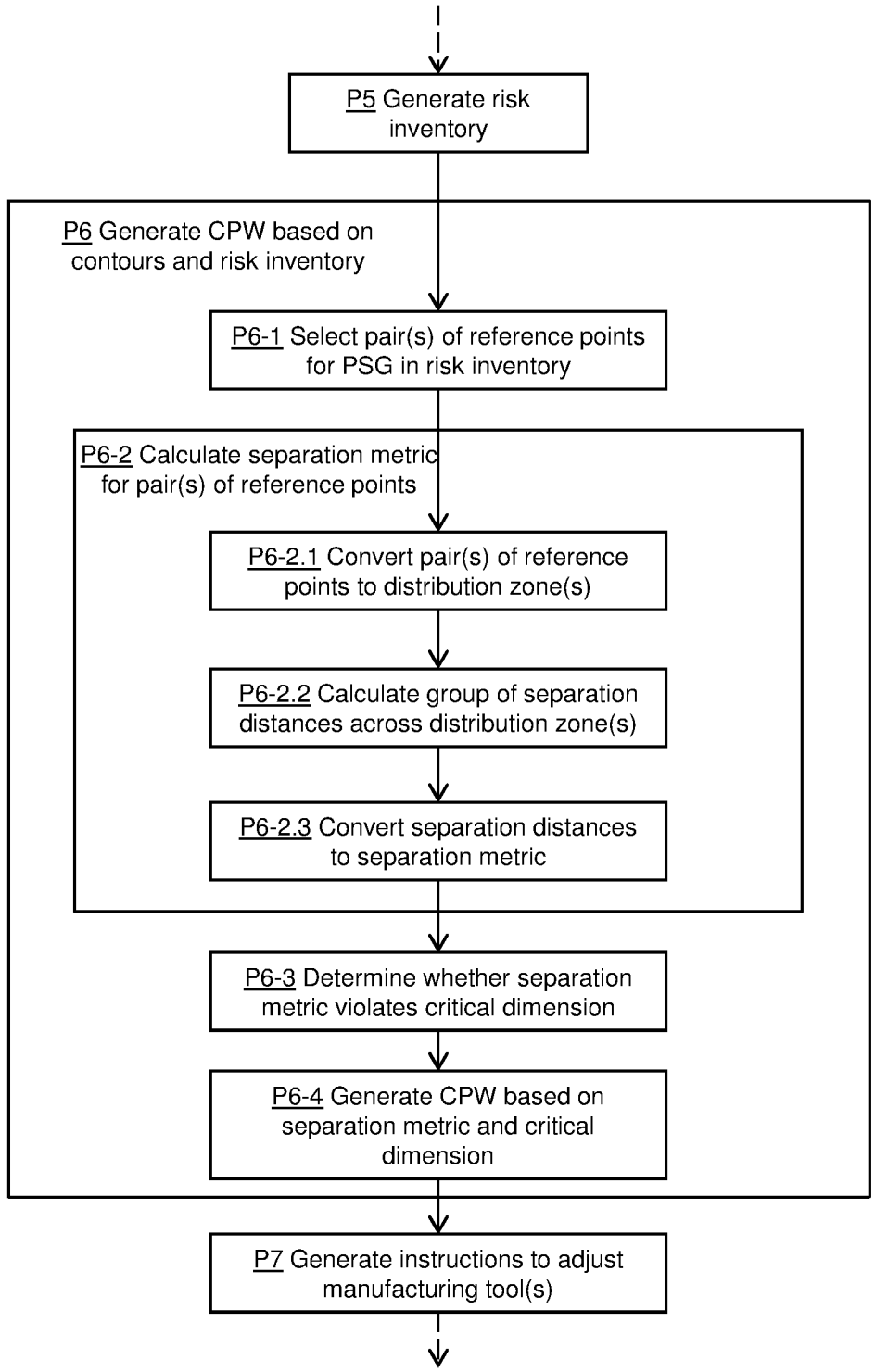
FIG. 10 is an example flow diagram of a method for calculating a separation metric according to further embodiments of the disclosure.

Referring now to FIGS. 1, 5, 8, and 9 together, further embodiments of the disclosure can include various sub-processes for generating CPW 196 in process P6. At process P6-1, the disclosure can include selecting one or more pairs of reference points for each PSG region 188 in risk inventory 190. The type of PSG region 188 (e.g., a risk of pinching or bridging) can determine the type of reference points selected in process P6-1. For instance, as shown in FIG. 9, representative contours 192 which pose a risk of bridging can have corresponding reference points P1, P2 located at nearby edges of neighboring contours 192. Representative contours 192 with a risk of pinching may have reference points P3, P4 located on opposing sides of the same representative contour 192.

Continuing to process P6-2, the disclosure can include calculating, e.g., with calculator 222 of image analysis system 220, a separation metric (e.g., separation distance $DS_N$ or edge separation width $W_N$) for each pair of reference points P6-2. The calculated separation metric(s) $DS_N$, $W_N$ can be used to identify pinching or bridging defects in each PSG region 188. At process P6-3, comparator 224 and/or determinator 226 can mathematically determine whether the calculated separation metric(s) $DS_N$, $W_N$ violate predetermined critical dimension (CD) values set forth in specification 100. For instance, specification 100 may indicate a range of separation metrics (e.g., minimum and maximum values) indicating that corresponding PSG region(s) 188 are free of pinching or bridging defects. The determination at process P6-3 can indicate whether the conditions for creating manufactured circuit 160 from specification 100 should be included in CPW 196. Continued processing according to the disclosure can include generating, at process P6-4, CPW 196 based on whether the calculated separation metric(s) $DS_N$, $W_N$ violate the predetermined CD values. For example, calculator 222 can import the exposure dose and depth of focus values for manufactured circuit(s) 160, and generate a profile of depth of focus versus upper and lower boundaries of exposure dose for the entire product. The position of CPW 196 in the plot, based on manufactured circuit 160, can identify possible manufacturing settings which violate CD requirements in specification 100 and/or which PSG region(s) 188 do not violate the CD requirements in specification 100.

Figure 11:
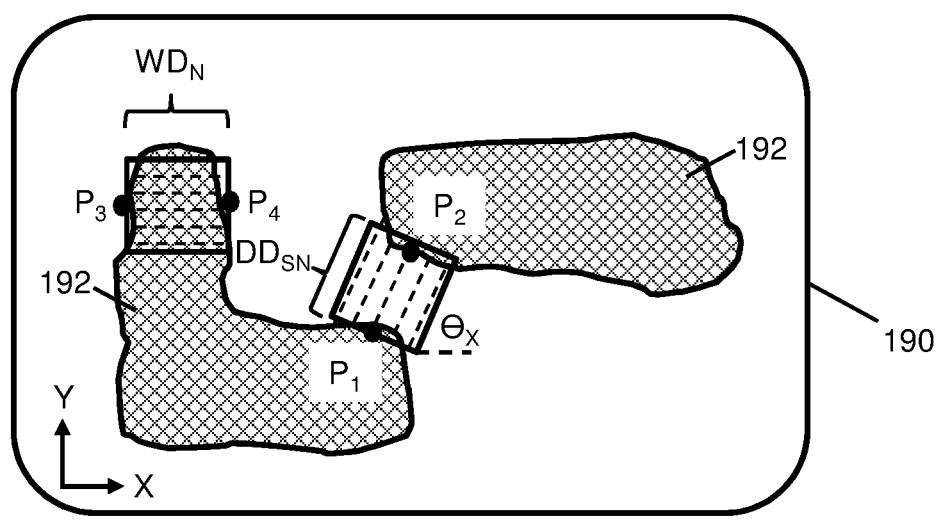
FIG. 11 depicts the calculation of a separation metric with a distribution zone according to embodiments of the disclosure.

Referring to FIGS. 1, 6, 10, and 11 together, sub-process P6-2 may optionally be subdivided into other sub-processes to provide a more sophisticated calculation of separation metrics. Rather than operating on single reference points, embodiments of the disclosure can evaluate separation metrics based on a range of distances proximate the chosen pairs of reference points, e.g., points P1, P2 or P3, P4 discussed herein. At process P6-2.1, and as illustrated in FIG. 11, the disclosure can include converting one pair of reference points (e.g., P1, P2 or P3, P4) into a corresponding distribution zone $DD_{SN}$, $W_{DN}$ for each PSG region 188 with a potential bridging or pinching defect. The properties of each $DD_{SN}$, $W_{DN}$ can include a distribution width, angle (e.g., angle θN relative to X-axis), etc., based on predetermined values in specification 100, ORC library 180, and/or other reference data in ADR 170 or memory 212. Regardless of the reference criteria used to create each distribution zone $DD_{SN}$, $WD_N$, the disclosure can proceed to process P6-2.2 of calculating a group of separation distances across each distribution zone $DD_{SN}$, $WD_N$. The group of separation distances thus may be expressed as a statistical distribution of distances corresponding to a particular pair of reference points. The flow may then proceed of converting each group of separation distances to a separation metric representing the most relevant separation distance in each distribution zone $DD_{SN}$, $WD_N$. Example values for each separation metric may include, e.g., a minimum separation distance, a maximum separation distance, or average separation distance in $DD_{SN}$, $WD_N$ for representing the separation between two reference points. Regardless of the chosen process methodology, the disclosure may continue to processes P6-3, P6-4 for generating CPW 196 based on the various separation distances, which can then be used to generate instructions 206 in process P7. According to an example, the selected etch rate, deposition time, depth of focus, exposure dose for creating manufactured circuit 160 may cause a significant number of defects and/or fall outside the CPW 196 according to the processes discussed herein. By constructing CPW 196, circuit analysis program 174 can adjust the depth of focus, exposure dose, and/or other processing settings to values within CPW 196 to reduce the number of defects and/or PSG regions 188. Where desired or applicable, another circuit can be manufactured from specification 100, using the adjusted settings, and the various analytical techniques discussed herein can be repeated to determine whether further adjustments are needed. The analytical techniques discussed herein may therefore provide an automatic analysis of manufactured circuits 160 to adjust manufacturing tool(s) 150 without the need for visual analysis, manual intervention, etc., as required in conventional manufacturing control.

Alternative Embodiments and Implementations

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As used herein, the term "configured," "configured to" and/or "configured for" may refer to specific-purpose patterns of the component so described. For example, a system or device configured to perform a function may include a computer system or computing device programmed or otherwise modified to perform that specific function. In other cases, program code stored on a computer-readable medium (e.g., storage medium), may be configured to cause at least one computing device to perform functions when that program code is executed on that computing device. In these cases, the arrangement of the program code triggers specific functions in the computing device upon execution. In other examples, a device configured to interact with and/or act upon other components may be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component may aid in performing a function, for example, displacement of one or more of the device or other component, engagement of one or more of the device or other component, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    converting an image of a manufactured circuit to a plurality of representative contours, the plurality of representative contours corresponding to printed features in the manufactured circuit, by actions including:
        detecting a set of coarse edges within the image of the manufactured circuit,
        calculating edge separation distances between the detected set of coarse edges within the image of the manufactured circuit, and
        correlating the calculated edge separation distances with a specification of the manufactured circuit to yield the plurality of representative contours;
    generating a risk inventory for the manufactured circuit based on the plurality of representative contours, the risk inventory being configured to identify at least one process sensitive geometry (PSG) in the manufactured circuit;
    generating a common process window (CPW) for the manufactured circuit based on the plurality of representative contours and the risk inventory, the CPW being indicative of manufacturing reliability of each feature in the manufactured circuit; and
    generating instructions to adjust a manufacturing tool for creating the manufactured circuit, based on the generated CPW.

2. The method of claim 1, further comprising:
    adjusting the manufacturing tool with the generated instructions, wherein the manufacturing tool comprises one of an etching system and a lithography system.

3. The method of claim 1, wherein the generating of the risk inventory for the manufactured circuit is further based on a set of predetermined manufacturing risks of the manufactured circuit.

4. The method of claim 3, wherein the set of predetermined manufacturing risks includes a PSG identified from a specification for the manufactured circuit.

5. The method of claim 1, wherein the generating of the common process window (CPW) for the manufactured circuit based on the plurality of representative contours and the risk inventory includes:
    selecting a pair of reference points corresponding to the at least one PSG in the risk inventory;
    calculating a separation metric for the pair of reference points in the plurality of representative contours;
    determining whether the separation metric violates a critical dimension (CD) for the manufactured circuit; and
    generating the CPW for the manufactured circuit based on whether the separation metric for the at least one PSG violates the CD.

6. The method of claim 5, wherein the calculating of the separation metric for the pair of reference points further includes:
    converting the pair of reference points to a distribution zone having the pair of reference points therein;
    calculating a group of separation distances for the at least one PSG across the distribution zone; and
    converting the group of separation distances to the separation metric for the pair of reference points, wherein the separation metric includes one of a minimum separation distance in the distribution zone, a maximum separation distance in the distribution zone, or an average separation distance in the distribution zone.

7. A computer program product stored on a non-transitory computer readable medium, the computer program product comprising program code, which when being executed by at least one computing device, causes the at least one computing device to perform actions including:
    converting an image of a manufactured circuit to a plurality of representative contours, the plurality of representative contours corresponding to printed features in the manufactured circuit, wherein the converting includes:
        detecting a set of coarse edges within the image of the manufactured circuit,
        calculating edge separation distances between the detected set of coarse edges within the image of the manufactured circuit, and
        correlating the calculated edge separation distances with a specification of the manufactured circuit to yield the plurality of representative contours;
    generating a risk inventory for the manufactured circuit based on the plurality of representative contours, the risk inventory being configured to identify at least one process sensitive geometry (PSG) in the manufactured circuit;
    generating a common process window (CPW) for the manufactured circuit based on the plurality of representative contours and the risk inventory, the CPW being indicative of manufacturing reliability of each feature in the manufactured circuit; and
    generating instructions to adjust a manufacturing tool for creating the manufactured circuit, based on the generated CPW.

8. The computer program product of claim 7, further comprising program code for causing the at least one computing device to perform adjusting of the manufacturing tool with the generated instructions, wherein the manufacturing tool comprises one of an etching system and a lithography system.

9. The computer program product of claim 7, wherein the generating of the risk inventory for the manufactured circuit is further based on a set of predetermined manufacturing risks of the manufactured circuit.

10. The computer program product of claim 7, wherein the set of predetermined manufacturing risks includes a PSG identified from a specification for the manufactured circuit.

11. The computer program product of claim 7, wherein the generating of the common process window (CPW) for the manufactured circuit based on the plurality of representative contours and the risk inventory includes:
    selecting a pair of reference points corresponding to the at least one PSG in the risk inventory;

calculating a separation metric for the pair of reference points in the plurality of representative contours;

determining whether the separation metric violates a critical dimension (CD) for the manufactured circuit; and generating the CPW for the manufactured circuit based on whether the separation metric for the at least one PSG violates the CD.

12. The computer program product of claim 11, wherein the calculating of the separation metric for the pair of reference points further includes:

converting the pair of reference points to a distribution zone having the pair of reference points therein;

calculating a group of separation distances for the at least one PSG across the distribution zone; and converting the group of separation distances to the separation metric for the pair of reference points, wherein the separation metric includes one of a minimum separation distance in the distribution zone, a maximum separation distance in the distribution zone, or an average separation distance in the distribution zone.

13. A system comprising at least one computing device configured to perform a method by performing actions including:

converting an image of a manufactured circuit to a plurality of representative contours, the plurality of representative contours corresponding to printed features in the manufactured circuit, wherein the converting includes:

detecting a set of coarse edges within the image of the manufactured circuit, calculating edge separation distances between the detected set of coarse edges within the image of the manufactured circuit, and correlating the calculated edge separation distances with a specification of the manufactured circuit to yield the plurality of representative contours;

generating a risk inventory for the manufactured circuit based on the plurality of representative contours, the risk inventory being configured to identify at least one process sensitive geometry (PSG) in the manufactured circuit;

generating a common process window (CPW) for the manufactured circuit based on the plurality of representative contours and the risk inventory, the CPW being indicative of manufacturing reliability of each feature in the manufactured circuit; and generating instructions to adjust a manufacturing tool for creating the manufactured circuit, based on the generated CPW.

14. The system of claim 13, wherein the at least one computing device is further configured to perform an action including:

adjusting the manufacturing tool with the generated instructions, wherein the manufacturing tool comprises one of an etching system and a lithography system.

15. The system of claim 13, wherein the generating of the risk inventory for the manufactured circuit is further based on a set of predetermined manufacturing risks of the manufactured circuit, and wherein the set of predetermined manufacturing risks includes a PSG identified from a specification for the manufactured circuit.

16. The system of claim 13, wherein the generating of the common process window (CPW) for the manufactured circuit based on the plurality of representative contours and the risk inventory includes:

selecting a pair of reference points corresponding to the at least one PSG in the risk inventory;

calculating a separation metric for the pair of reference points in the plurality of representative contours;

determining whether the separation metric violates a critical dimension (CD) for the manufactured circuit; and generating the CPW for the manufactured circuit based on whether the separation metric for the at least one PSG violates the CD.

17. The system of claim 16, wherein the calculating of the separation metric for the pair of reference points further includes:

converting the pair of reference points to a distribution zone having the pair of reference points therein;

calculating a group of separation distances for the at least one PSG across the distribution zone; and converting the group of separation distances to the separation metric for the pair of reference points, wherein the separation metric includes one of a minimum separation distance in the distribution zone, a maximum separation distance in the distribution zone, or an average separation distance in the distribution zone.

* * * * *